(12) United States Patent
Schmidhuber

(10) Patent No.: US 6,534,942 B2
(45) Date of Patent: *Mar. 18, 2003

(54) INTELLIGENT CONTROL AND ADJUSTMENT DEVICE

(75) Inventor: Max Schmidhuber, Freinsheim (DE)

(73) Assignee: PS Automation GmbH für Gesellschaft Antriebstechnik (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/485,019
(22) PCT Filed: May 29, 1998
(86) PCT No.: PCT/EP98/03205
§ 371 (c)(1), (2), (4) Date: Jan. 31, 2000
(87) PCT Pub. No.: WO98/54627
PCT Pub. Date: Dec. 3, 1998

(65) Prior Publication Data
US 2002/0074967 A1 Jun. 20, 2002

(30) Foreign Application Priority Data
Jun. 2, 1997 (DE) .................................. 297 09 588 U

(51) Int. Cl.[7] ................................................ G05B 9/02
(52) U.S. Cl. ........................................ 318/563; 318/565
(58) Field of Search ................................ 318/599, 282, 318/565, 626, 612, 434, 286, 685, 600, 563, 671; 165/200, 201, 266, 267, 270

(56) References Cited

U.S. PATENT DOCUMENTS

| 4,070,604 A | * | 1/1978 | Usry |
| 4,084,120 A | * | 4/1978 | Lund |
| 4,097,786 A | * | 6/1978 | Lund |
| 4,369,401 A | * | 1/1983 | Fayfield et al. |
| 4,376,450 A | * | 3/1983 | Fayfield et al. |
| 4,417,312 A | * | 11/1983 | Cronin et al. |
| 4,445,075 A | * | 4/1984 | Fry |
| 4,463,291 A | * | 7/1984 | Usry |
| 4,774,674 A | * | 9/1988 | Otake |
| 4,794,314 A | * | 12/1988 | Janu et al. |
| 4,845,416 A | * | 7/1989 | Scholl et al. |
| 5,168,200 A | * | 12/1992 | Payne |
| 5,249,117 A | * | 9/1993 | Greenough et al. |
| 5,422,808 A | * | 6/1995 | Catanese, Jr. et al. |
| 5,606,236 A | * | 2/1997 | Tennies et al. |
| 6,084,365 A | * | 7/2000 | Anderson et al. |

FOREIGN PATENT DOCUMENTS

DE 3623651 A1 7/1988 ........... G05B/15/02

* cited by examiner

Primary Examiner—Khanh Dang
(74) Attorney, Agent, or Firm—Pendorf & Cutliff

(57) ABSTRACT

An intelligent control and regulating device, especially for use in the process technology for flowable substances and media, which is built into the housing of an adjusting drive mechanism or into the drive mechanism itself and which has an adjustment arrangement controlling an adjusting member via an auxiliary energy device depending on sensor signals. The inventive control and adjusting device, which reacts reliably and rapidly to changing ambient conditions, includes a parameterable process regulator which receives adjustment input signals from the external sensors.

29 Claims, 4 Drawing Sheets

INTELLIGENT CONTROL AND ADJUSTMENT DEVICE

BACKGROUND OF THE INVENTION

Field of the Invention

The invention concerns an intelligent control and regulating device, especially for use in the process technology for flowing materials and mediums which i) is integrated into the housing of an actuator or attached to an actuator and, ii) has a regulating arrangement which controls an actuator from an auxiliary energy unit in dependence on signals from sensors.

So far, actuators used in process technology have a sensor located in the process field which transmits a signal of the actual condition of the process to a central controller which is, for example, located in a control room or a similar process control unit.

The central controller compares this feedback value of the process with a preselected setpoint process value. When this comparison is evaluated, a corresponding positioning signal is sent to the actuator. A positional controller, which is mounted in the actuator, receives the positioning signal from the central controller and transposes it into the proportional stroke position or angle of turn which is passed on to the actuator by an electric motor.

Such regulators are extremely expensive and complex especially when many measurement and regulating points are necessary because they require numerous individual units and an extensive cable network.

In order to avoid the extensive cabling between actuator and central controller, which are always separated, a unit for regulating and controlling an electrical drive system is known from the DE 39 28 451 A1 where the motor is mounted in the same housing together with devices for the recognition of position and monitoring of the speed of rotation, for electronic commutation, for control and regulation and for accomplishing the communication.

This has the disadvantage that the computer in the process control center is not fast enough to tap all magnitude cycles and to calculate their feedback position values if there is a multitude of control loops or very rapid regulation, so that unwelcome delays occur and the quality of control is reduced.

SUMMARY OF THE INVENTION

It is therefore the task of the invention to present a control and regulating device which reacts reliably and rapidly to changes in the process conditions, especially changes in the ambient conditions.

The invention solves this task by using a regulating arrangement with a parameterised process controller which receives input control signals from external sensors.

The invention has the advantage of the process controller being built into the actuator itself thus forming an independent system. The load on the process control center is reduced and less installation work is required.

Provided that the feedback value of the control parameter, i.e. the output signal of the external sensor, is directly connected to the actuator, the integrated process controller calculates the manipulated magnitude independently and can act on the actuator without delay so that shorter cycle times are realized.

The process controller is freely parametered so that the control and regulation characteristics can be modified and adjusted to new conditions at any time.

In an advanced version, the process controller becomes part of a power module which is connected to a central control unit bi-directionally using an interface module. It is now possible to reduce the process control unit to display data and the adjustment to the set reference variables and setpoint values.

The power module has, besides the process controller, an auxiliary energy control which is connected through inlets to the internal sensors which collate actuator-specific data and to the external sensors providing the process-specific data. The integration of these elements reduces costs while making the control more reliable.

The interface module can be designed as a plug-in unit. This has the advantage of an easy adjustment of the control and regulating device to the conditions of communication in the process control unit simply by changing to the desired interface module.

The data exchange with the central control unit can be facilitated using analogue or binary signals. Serial data transfer using a data bus is also possible provided that the interface module is equipped for it. Conventional interface modules have at least one potential-free relays for setting up an electrical connection between the interface module and the environment.

The modular setup permits the use of standardized systems.

It is recommended to parameterize the process controller with the actuator-specific parameters after the assembly of the individual modules onto the actuator. This means that the actuator can be configured after assembly and the control start-up is simplified. The specific application need not be known when the actuator is manufactured.

The actuator can be easily adjusted to the specific conditions of application through the software and without any module exchange.

In another design, the process controller can be a digital controller of the type P, PI or PID. The PID controller permits the setting of the proportionate range, holding and adjusting times independently of each other, following the initial assembly of the modules onto the actuator.

Parametering is easy if a micro-processor is used as process controller.

An operating panel is mounted to the power module for manual control of the actuator and/or to parameterize the actuating functions. The operating panel can be either mounted to the actuator or designed as a plug-in connection. It is also possible to prepare the operating panel for permanent wall fixing near the actuator. The operating panel is then connected by cable to the power module.

To monitor the operating conditions of the actuator, the process controller is connected to internal sensors for monitoring the actual position and/or the actuating forces or torques exerted at the output of the actuator.

The process controller acts upon the auxiliary energy unit using the auxiliary energy controller. If this auxiliary energy unit is an electronically regulated electric motor, preferably a DC motor, the torques and actuating forces can be easily measured by measuring the motor current.

However, the auxiliary energy unit is not restricted to electric motors. Hydraulic and pneumatic units may also be used.

In an advanced version, internal, actuator-specific data required for diagnostic purposes are non-erasably stored in the power module. A self-diagnosis is carried out through the constant monitoring of this data, permitting a fast reaction to errors and the early identification of the source of error.

The internal actuator-specific data stored may be read out using a serial interface which is integrated into the power module or an interface module via a data bus.

The serial interface in the power module can also be used for the input of actuating parameters.

It is more advantageous to calculate the values measured by the internal and external sensors as process characteristics in the power module and to assign them to the central control unit for further processing, using the interface module.

A regulating correction magnitude which has been stored as a table or a characteristic curve in the power module improves the quality of control.

BRIEF DESCRIPTION OF THE DRAWINGS

The invention permits numerous designs one of which will be explained below, with the aid of the figures in the schematic drawings.

DETAILED DESCRIPTION OF THE INVENTION

Figure 1:
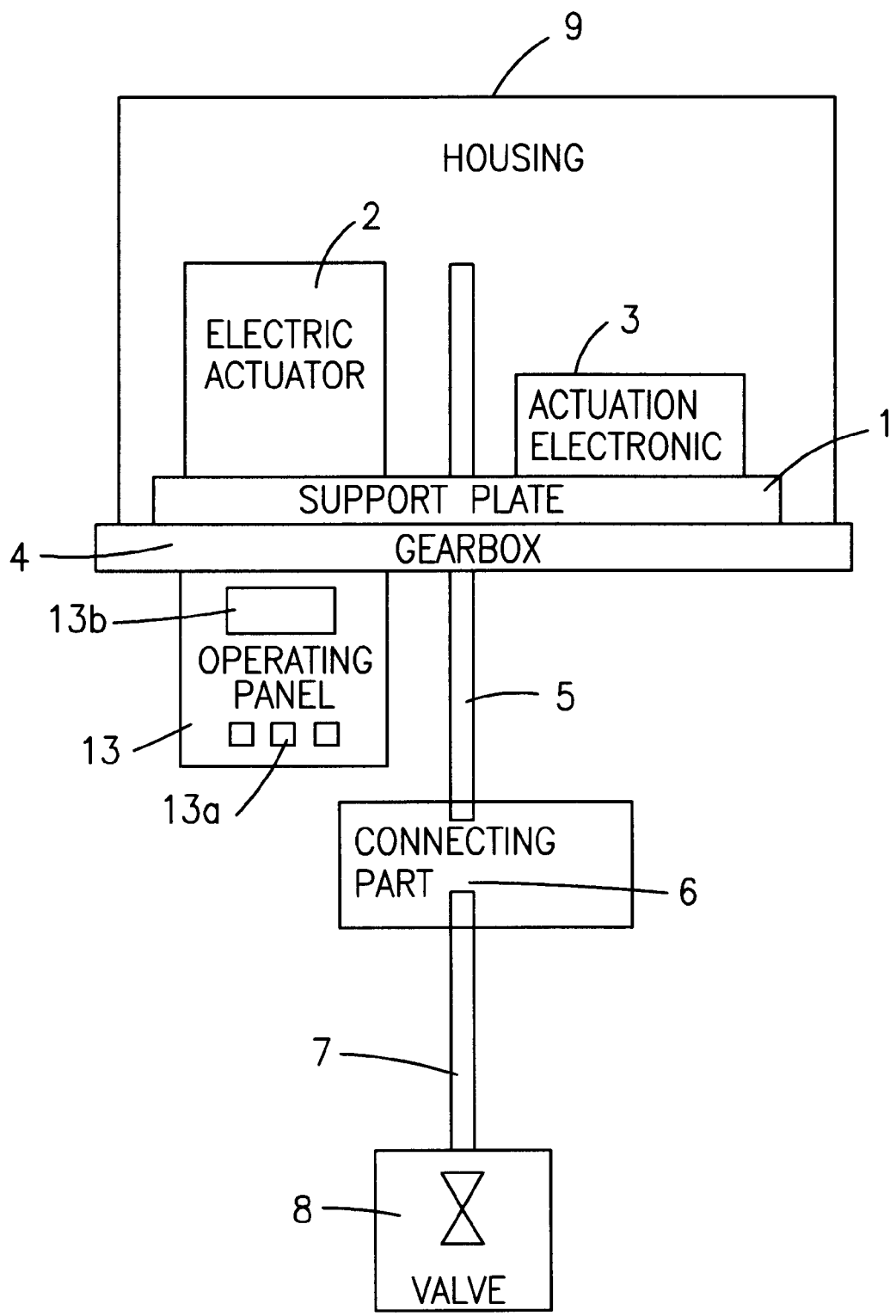
FIG. 1: Illustration of the principle of an actuator
Figure 2:
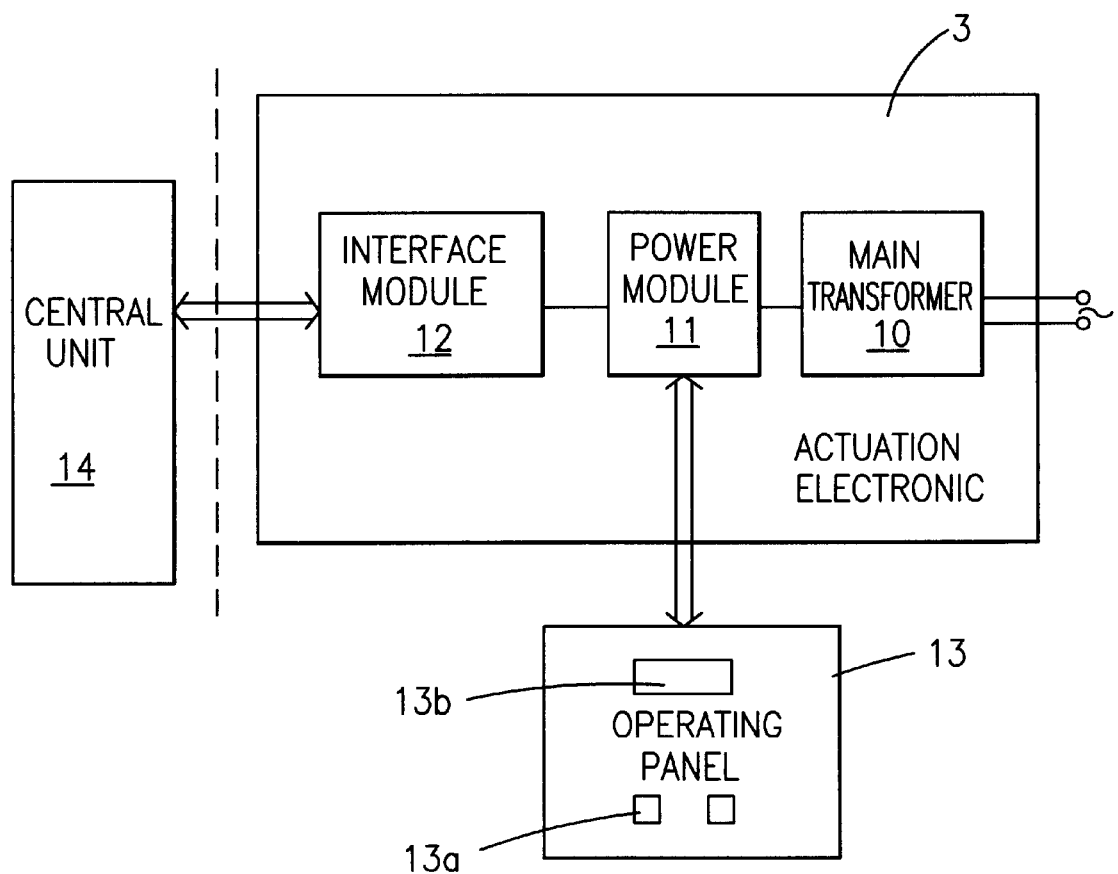
FIG. 2: Illustration of the electronics of the actuator

FIG. 1 shows the simplified version of an actuator for valve control used normally in the process technology for flowing materials and mediums, e.g. in the water or sewage technology, the chemical industry or power station technology.

An electric motor (2) is mounted to a support plate (1). Using a gearbox (4), the electric actuator (2) operates the output shaft (5) of the actuator in accordance to the control signals given by an actuation electronics (3).

The electric motor (2) and the actuation electronics (3) including the support plate (1) are placed in a housing (9) which is closed off by the attached gearbox (4). The actuation electronics (3) are mounted onto the actuator. The actuation electronics (3) are normally placed inside the actuator but may also be attached to the outside of the actuator.

The output shaft (5) has a connecting part (6) into which the operating shaft (7) of the valve (8), which has to be controlled, is inserted, transferring the movement of the actuator to the valve. The actuator can have either a stroke or a rotational movement.

The actuation electronics (3) is of modular design, consisting of the following components according to FIG. (2):

A mains transformer (10) for supplying the actuator, a power module (11) for carrying out the process control and regulating the electric motor (2), and an interface module (12) for connecting the actuator to a process central unit (14).

An operating panel (13) is placed outside the actuator and functions as manual actuation control. It can also be used for parametering the actuation functions. The operating panel should be attached to the outside of the actuator (FIG. 1). It can either be mounted permanently or designed as a plug-in connection. It is also possible to design the operating panel (13) as a remote control in which case the actuator would require a receiver for wireless signals such as infrared signals.

In another design, the operating panel (13) has a mobile, i.e. cable connection to the actuation electronics (3) (not depicted).

The actuation electronics (3), in particular the power module (11) is always connected to the operating panel (13) using a bi-directional data cable. This operating panel (13) has a keyboard (13a) and a display (13b) so that the operator can directly act upon the actuator to carry out all important functions.

Figure 3:
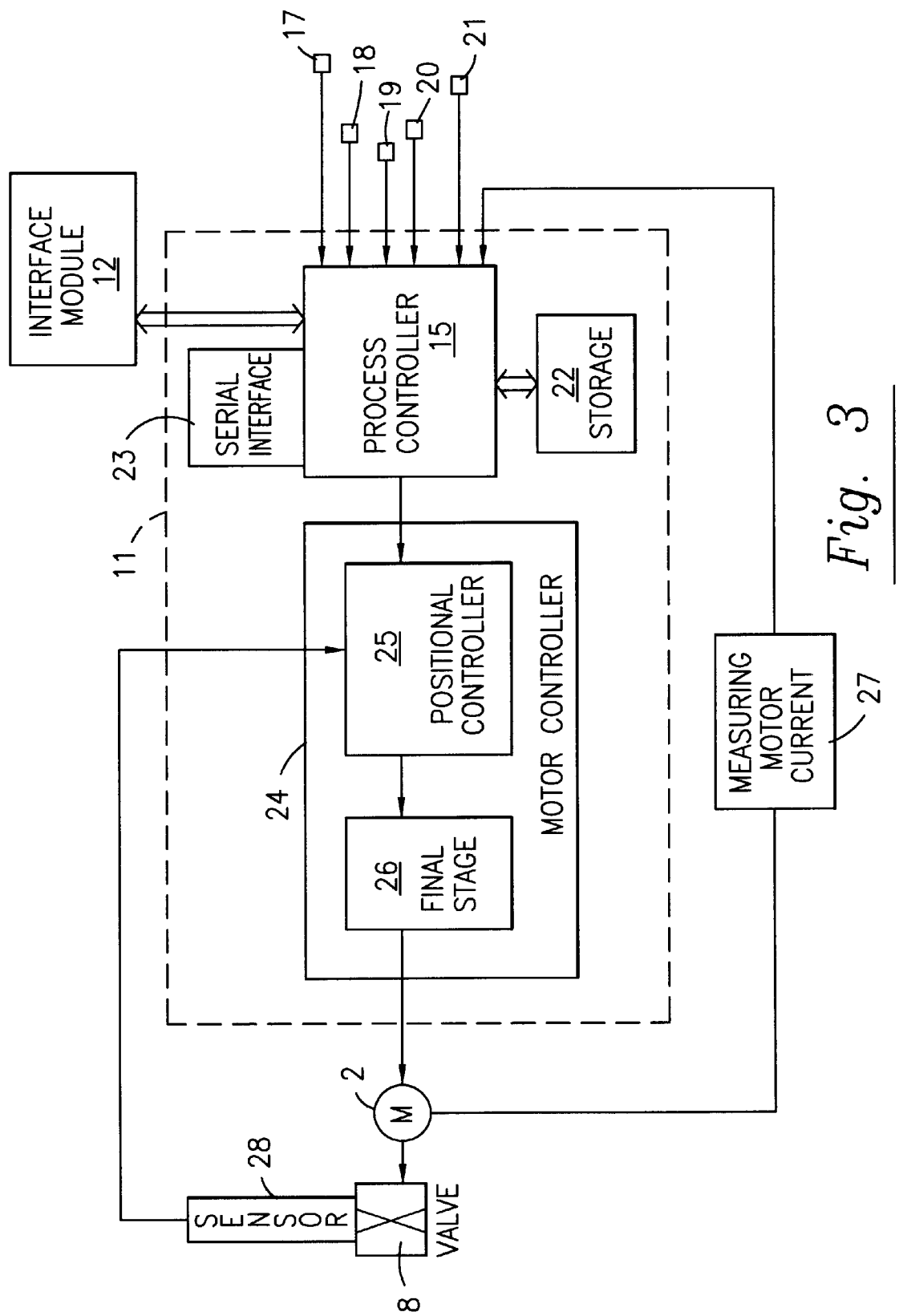
FIG. 3: Illustration of the power module of the actuation electronics

FIG. 3 shows the design of the power module (11). It consists of a process controller (15) with inputs connecting it to external sensors that supply process-specific data. These are a temperature sensor (17), a pressure sensor (18) and a flowmeter (19). In addition, the process controller (15) can be connected to an external sensor measuring the wear at the valve (8).

Further to this, internal sensors are connected to the inputs of the process controller (15) measuring data which characterize the operational behavior of the actuator, such as a motor temperature sensor (20) and a device measuring the actuator's internal temperature (21). The process controller (15) has a memory bank (22) where the process parameters and operating parameters are saved. The storage (22) is of the EEPROM type. The process controller (15) is connected to the storage (22) using a bi-directional data link.

A serial interface (23) facilitates the communication of the power module (11) with a personal computer or laptop.

The output of the process controller (15) is connected to the motor controller (24). This motor controller (24) has a positional controller (25) which acts upon the electric motor (2) via a final stage (26).

A comfort version of the process controller (15) can do without the positional controller because here, its function is carried out by the process controller itself. The controller acts directly upon the motor in dependence on the external sensor signals.

In the case shown here, an electronically commutated DC motor is used. It is connected to a device measuring the motor current (27) which leads to the inlet of the process controller (15). The process controller (15) calculates the torque or the nominal force at the actuator output from the motor current measured.

The process control inside the actuator works as follows: through the interface (12), a set reference variable, e.g. the setpoint value of the process, is transmitted to the process controller (15) from the process control unit (14) using a bus system. A process feedback value is determined from the signals sent by the sensors 17, 18 and 19 which is then compared to the process setpoint value. Provided that the sensor signals represent the process feedback value, it is compared to the process setpoint value and then the positional setpoint value for the positional controller (25) is calculated.

The positional controller (25) ensures the proportionality between the positional setpoint value and the angle of turn or the stroke of the valve (8). The positional controller (25) constantly compares the electric input signal supplied by the process controller (15) to the feedback value of the valve position. The feedback value of the valve position is determined by a sensor (28), which should be a potentiometer, placed at the output shaft (5) in the actuator. The signal from this sensor is fed back to the positional controller (25).

The controller determines the speed, the force or torque and the position of the actuator output in dependence to the designated setpoint and to the values measured by the sensors.

The process control unit (14) only supplies the manipulating signal to the actuator and displays the condition of the individual feedback loops. The regulating magnitude is calculated inside the actuator which is then sent to the positional controller (25) controlling the motor (2).

Figure 4:
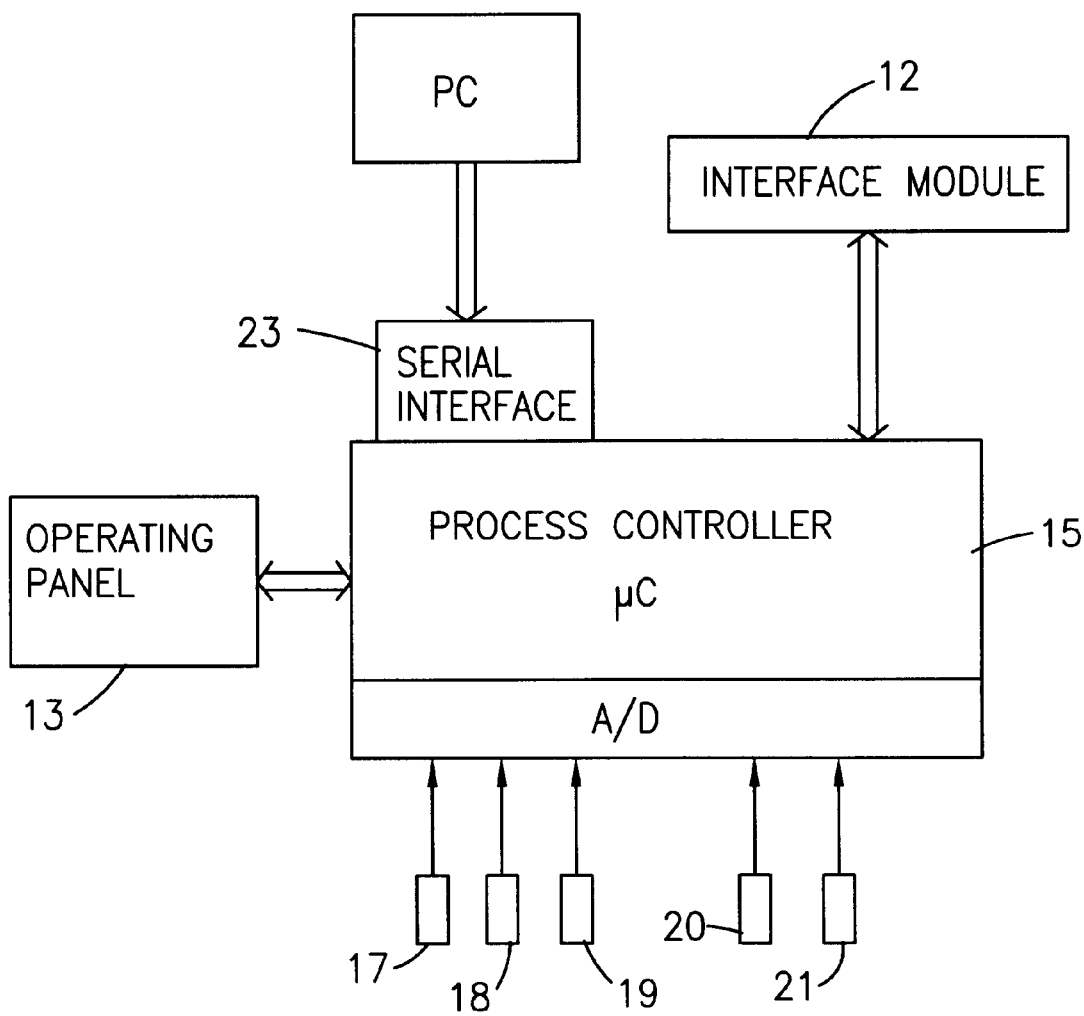
FIG. 4: The process controller design using a microprocessor.

It is recommended to design the process controller (15) using a micro-processor with freely parameterable software, as illustrated in FIG. 4.

A PID controller can easily be realized using the micro-processor. This PID controller is well-suited for the control task described above.

Where continuous positioning is required, the PID controller creates the positional setpoint value for the actuator inside the actuator itself. This setpoint value is compared to the feedback value of the position. The differential signal resulting from it is the magnitude for controlling the motor. The motor is controlled until the differential signal is almost 0. This principle causes the actuator to follow the setpoint value continuously even if deviations are minimal, and the actuator is constantly in action.

The memory bank (22) for storing the process and operational parameters is located inside the micro-processor. Alternatively, it can be outside the microprocessor and is connected to it by a bi-directional data link.

Operational parameters stored for diagnosis purposes are operating data such as the operating time and the switching frequency of the motor. The last ten measuring values of the external and internal sensors are also stored. Other relevant data for diagnosis are the motor temperature, the motor current, the temperature of the housing and the actuator position. It is possible to carry out preventative maintenance on the actuator due to the self-monitoring electronics and the registration of the motor operating times in certain critical conditions.

The data for diagnosis is read out using the serial interface (23) or the fieldbus interface (12).

The measured values of the external and internal sensors, which are connected to the inlets of the micro-processor (15), are cyclically queried. If critical values are detected, safety positions are automatically taken or potential-free relays are switched which signal the critical condition.

Data for correcting the characteristic line of the actuator are stored in the memory bank (22). They are presented either as a table or as a characteristic line.

Nominal process magnitudes are calculated from the values measured by the internal and external sensors. This data is transmitted for further use, e.g. for display in the process control unit (14) using the interface module (11).

The P, PI or PID controller can operate as an independent fixed value controller, if it is connected to the external sensor inlets and the internal sensors. It can also be used as an analogue or digital process controller guided from the process control unit (14).

The modular design of the control and regulating device ensures that the actuators are manufactured extremely economically. The software of the micro-processor is freely parameterable and therefore, the actuator can be programmed after the actuator and the control and regulating device have been completely assembled. The actuator-specific parameters are set at the actuator manufacturer's. Similarly, the basic parameters of the PID controller are stored in the memory bank (22) of the micro-processor (15), using the interface module (12) or the serial interface (23).

The parameters for a continuous PID control which can be freely set are the proportionate range, the holding and adjusting times. These parameters are set and stored independently of each other at the manufacturer's and depend on the type of actuator. The basic specific actuator parameters are stored in non-erasable memory.

The user can then create the data specific for each application, which is based on the actuator-specific data, and store them in the memory bank (22) as well. These parameters which are specific to a certain application and any other parameters required are stored in a re-writable memory. This has the advantage that the actuator application can be decided after the mechanical assembly.

All parameters stored are maintained even in case of a mains failure.

Parametering is a simple operation carried out using a PC.

Parametering should only be made by authorized personnel and therefore the stored data must be protected by an identification code. This code is also stored in the micro-processor (15) memory bank (22). Data can only be entered on condition that the micro-processor (15) has recognized and approved the code.

Complex regulation tasks comprising of several input magnitudes can be solved most efficiently and comfortably by means of an intelligent actuator equipped with an integrated process controller and several analogue inlets for external sensors.

Consider as an example a flow-rate control. The pressure is measured in front of and behind the valve (8) at standardized measuring points by a differential pressure transformer, not described any further. The characteristic curve of the valve is stored in the non-erasable memory (22). The flow-rate can be exactly calculated from the differential pressure and the valve stroke measured and therefore a special flow-rate controller is not required.

In the simplest case, the setpoint value of the valve position is directly preset by the central process control unit (14); the flow-rate calculated by the micro-processor (15) is sent to the process control unit (14) where it is displayed. In this way it is possible to transmit not only the actuator position but also limit values and error messages to the central process control unit (14).

Moreover, a set reference variable can be supplied, which corresponds to the desired flow-rate. Here the stroke or angle of turn of the valve (8) are adjusted until the result of the current calculation coincides with the desired valve.

What is claimed is:

1. An intelligent control and regulating device for use in regulating the flow of materials, and comprising:
    an actuator operatively associated with a means for controlling the flow of said materials, said actuator having a housing;
    a parameterable process controller (15) as an intelligent control and regulating device, which receives input signals for regulation from external sensors (17, 18, 19) supplying process-specific data, and which controls said actuator from an auxiliary energy unit in response to said signals from said sensors,
    wherein said controller is integrated within the housing of the actuator.

2. An intelligent control and regulating device according to claim 1, wherein the process controller (15) is adapted to be parameterized with actuator-specific data after the initial assembly of the modules (10, 11, 12) with the actuator.

3. An intelligent control and regulating device according to claim 2, wherein the process controller (15) is a P, PI or PID controller.

4. An intelligent control and regulating device according to claim 3, wherein a PID controller is provided for setting the proportionate range, holding and adjusting times independently of each other, subsequent to initial assembly.

5. An intelligent control and regulating device according to claim 2, wherein the process controller (15) is a micro-processor.

6. An intelligent control and regulating device according to claim 1, wherein an operating panel (13) for manual control of the actuator and/or parametering of the actuator functions is connected to the power module (11).

7. An intelligent control and regulating device according to claim 6, wherein the operating panel (13) is attached to the actuator.

8. An intelligent control and regulating device according to claim 6, wherein the operating panel (13) is connected to the actuator by a plug-in connection.

9. An intelligent control and regulating device according to claim 6, wherein the operating panel (13) is adapted for permanent wall fixing and is connected by cable to the power module (11).

10. An intelligent control and regulating device according to claim 1, wherein, the power module (11) has stored internal actuator-specific data in a non-erasable memory bank (22) so that they can be diagnosed.

11. An intelligent control and regulating device according to claim 10, wherein the stored internal, actuator-specific data can be read using either an integrated serial interface (23) integrated into the power module (11) or an interface module (12) through the data bus.

12. An intelligent control and regulating device according to claim 1,
    wherein the actuator is connected to a valve (8), and wherein, subsequent to connecting the actuator to the valve (8), an automatic initializing run is programmed into the control unit, during which the actuator and the limit positions are automatically adjusted to the valve (8).

13. An intelligent control and regulating device for use in regulating the flow of materials, and comprising:
    an actuator operatively associated with a means for controlling the flow of said materials, said actuator having a housing;
    a parameterable process controller (15) as an intelligent control and regulating device, which receives input signals for regulation from external sensors (17, 8, 19) supplying process-specific data, and which controls said actuator from an auxiliary energy unit in response to said signals from said sensors,
    wherein said controller is integrated into the housing of the actuator or attached to the actuator, and
    wherein said process controller (15) is part of a power module (11), and further including an interface module (12) bi-directionally connecting a central control unit (14) with said process controller (15).

14. An intelligent control and regulating device according to claim 13, wherein said power module (11) has, besides the process controller (15), an auxiliary energy control (25) and is connected through inlets to internal sensors (20, 21) supplying actuator-specific data, and to external sensors (17, 18, 19) supplying process-specific data.

15. An intelligent control and regulating device according to claim 13, including a modular mains transformer for supplying energy to the power module (11).

16. An intelligent control and regulating device according to claim 13, wherein the interface module (12) is a plug-in unit.

17. An intelligent control and regulating device according to claim 13, wherein the interface module (12) is adapted to transfer data to the central control unit (14) using analogue and/or binary signals.

18. An intelligent control and regulating device according to claim 13, wherein using the interface module (12), data is exchanged with the central control unit (14) by a serial data transfer using a data bus.

19. An intelligent control and regulating device according to claim 13, wherein the interface module (12) is connected to the surroundings electrically using a potential-free relay.

20. An intelligent control and regulating device according to claim 14, wherein the process control (15) is connected either to internal sensors (20, 21) for monitoring the actual position and/or the actuating forces or torques exerted at the output of the actuator.

21. An intelligent control and regulating device according to claim 14, wherein the process controller (15) acts upon the auxiliary energy control (24) using the auxiliary energy unit (2).

22. An intelligent control and regulating device according to claim 21, wherein the auxiliary energy unit (2) is an electronically regulated motor.

23. An intelligent control and regulating device according to claim 22, wherein the motor (2) is a DC motor and the torques and nominal force are calculated from the motor current.

24. An intelligent control and regulating device according to claim 21, wherein the auxiliary energy unit (2) is a pneumatic unit.

25. An intelligent control and regulating device according to claim 21, wherein the auxiliary energy unit (2) is a hydraulic unit.

26. An intelligent control and regulating device according to claim 13, wherein the actuation parameters are read in using the interface (23) which is integrated into the power module (11).

27. An intelligent control and regulating device according to claim 14, wherein the values measured by the internal (20, 21) and external sensors (17, 18, 19) are calculated as process characteristic magnitudes inside the power module (11) and transmitted to the central control unit (14) using the interface module (12).

28. An intelligent control and regulating device according to claim 13, wherein correction data for an improved quality of control are stored in the power module (11).

29. An intelligent control and regulating device for use in a regulator for regulating the flow of materials, which includes a microprocessor for effecting the control of the flow of said materials, determining a position intended value for an actuator of the regulator based on sensor signals, wherein the regulator uses an auxiliary energy unit to control the actuator;
    thereby characterized,
        that the regulating device is a parameterable process controller (15) which simultaneously carries out the function of a position controller (25) for the positioning element (8) and receives input signals for regulation from external process-specific sensors (17, 18, 19), and from a comparison of (a) a process intended value which had been preset in a central control unit (14) and (b) a process actual value which is determined from the signals transmitted by the external sensors (17, 18, 19), determines the position intended value,
        wherein drive circuitry (3) including said parameterable process controller (15) is integrated within the housing (9) of the actuator or is attached to the actuator.

* * * * *